1588X
W. Humphrey.
Carding Mach.
Patented Oct. 4, 1811.
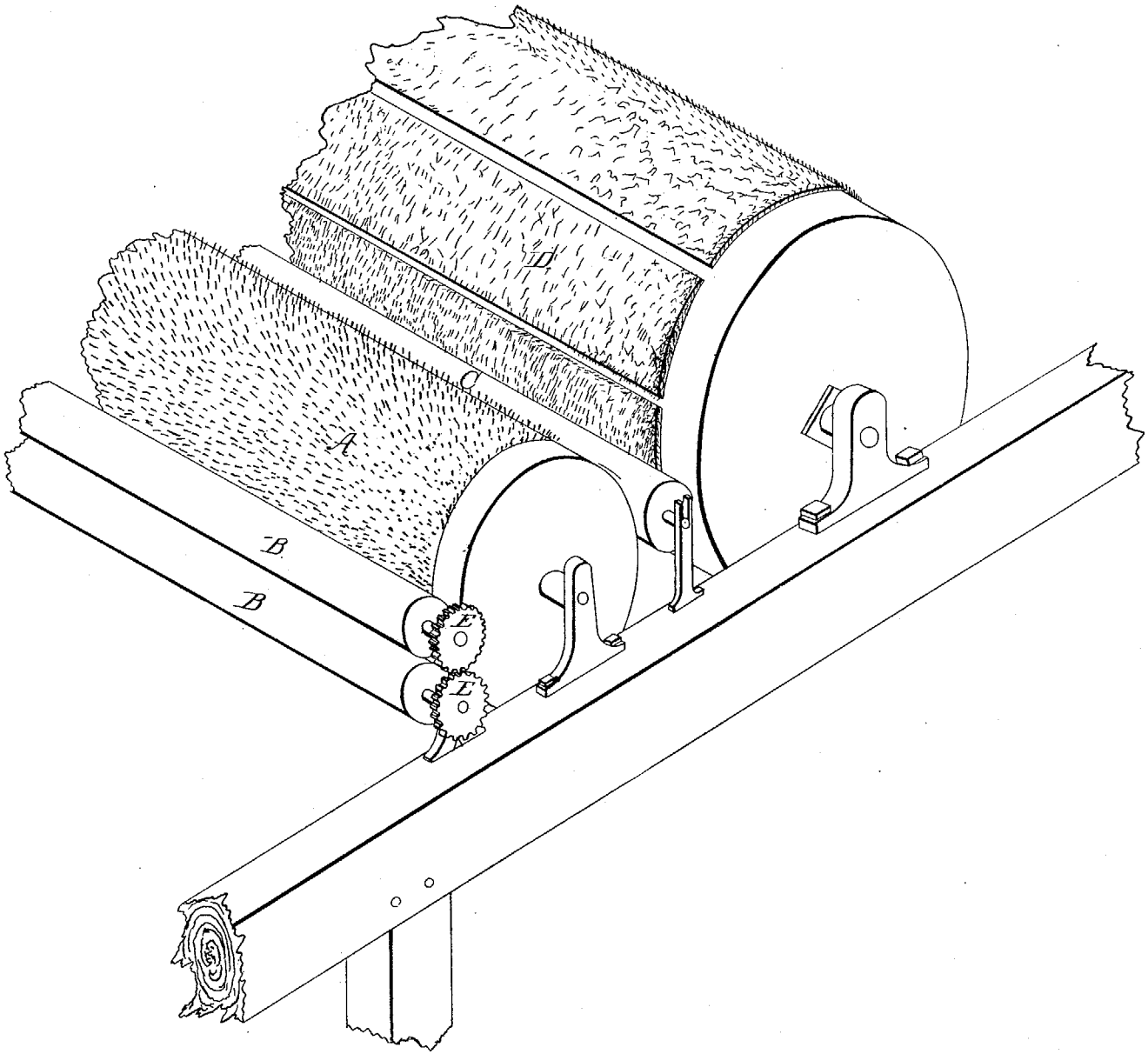
N. PETERS, PHOTO-LITHOGRAPHER, WASHINGTON, D. C.

[illegible] 1588X

William Humphreys.

Letters Patent.

The Schedule referred to in these Letters Patent and making part of the same, containing a description in the words of the said William Humphreys himself, of his Machine for drawing and Spinning Wool, called the Humphreysville Spinner.

The machines for drawing and spinning are composed of Rollers, a description of which is as follows Viz.
The wool from the carding machines, passes through the back rollers which conduct it to the card or tooth roller by the assistance of another small roller which inclines it to the teeth of the tooth or card roller. From the tooth roller it is drawn to any size that may be required by a pair of front rollers coupled together and weighted, either by repeating the operations through the same or other machines upon the same principles, or by increasing the velocity of the front rollers.

The principle is, the front rollers draw the staple of the wool through the teeth of the card or tooth roller or rollers as the case may require. The card or tooth roller or rollers retain the bulk of the wool, drawing or revolving, and feed it perfectly even to the front rollers, which reduce it to any size required by repeated operations.

The diameters of the rollers & gearing may be altered as circumstances may require.

The object of this machine is to take the wool either in rolls or in strings from the carding machine as may be deemed most expedient, and deliver it in size suitable to be spun into such numbers as may be desired.

upon upon Machinery calculated on the above principl[illegible]
and carried by wheels & pinions which may but [illegible]
the cotton, except in the motions, size of rollers, & the
card or tooth rollers between the front and back
rollers.

William Humphr[illegible]

Witnesses
Amasa Porter
John Ward

Supplement

I extend the principles of the above to the drawing [illegible]
spinning of all the various substances of wool, worste[illegible]
Hemp, flax & cotton, by varying the size of the [illegible]
in proportion to the staple of the articles. also the [illegible]
onal principle of a gig bobbin, which contains [illegible]
rovelings & serves for the purpose of throwing the tw[illegible]
out of the rovelings, before it enters the back rol[illegible]
of the Machine, which has the tendency to open the rov[illegible]
and makes it by the draft of the front rollers, to d[illegible]
more easy and pliable through the teeth of the car[illegible]
or tooth rollers than it otherwise would The Machinery for preparing and spinning [illegible]
Flax and other articles, will be the same same in
principles, as the former specification for wool, bu[illegible]
different as to their sizes & the several proportions
of their various parts The principles of the Machinery are ca[illegible]
culated to take the the raw materials either from
the cards in rolls or strings or from the Hatchel [illegible]
the article of flax. to prepare it in rovelings & the[illegible]
spin it into yarn upon different Machines upon [illegible]
same principles.

Woolen rovelings prepared upon a bil[illegible]

15888 or [illegible] which will ensure the performance equally well to be seen on this plan as is demonstrated by a machine [illegible] of this plan of the spindles now in operation Witnesses
Tho. Thornton
Geo. Lyon Wm Humphries
Engr
Chatham 590 [illegible]

Drawing made
A.H.S.